United States Patent
Rodriguez et al.

(10) Patent No.: US 8,019,062 B2
(45) Date of Patent: *Sep. 13, 2011

(54) METHOD AND SYSTEM FOR TRANSFERRING AN ADMINISTRATOR AND ASSOCIATED CHARGES DURING A MULTI-WAY CALL

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 654 days.

This patent is subject to a terminal disclaimer.

(21) Appl. No.: 12/057,022

(22) Filed: Mar. 27, 2008

(65) Prior Publication Data

US 2008/0175363 A1 Jul. 24, 2008

Related U.S. Application Data

(63) Continuation of application No. 10/965,145, filed on Oct. 14, 2004, now Pat. No. 7,492,880.

(51) Int. Cl.
  *H04M 15/00* (2006.01)
  *H04M 11/00* (2006.01)
  *H04L 12/66* (2006.01)
(52) U.S. Cl. ......... 379/114.22; 379/114.21; 379/127.03; 455/406; 370/352
(58) Field of Classification Search ............. 379/114.01, 379/114.21–114.23, 114.26, 114.28, 121.05, 379/126, 127.03, 127.05, 202.01, 205.01, 379/207.01, 207.02; 370/260, 352; 455/405–408, 416

See application file for complete search history.

(56) References Cited

U.S. PATENT DOCUMENTS

| | | | |
|---|---|---|---|
| 4,788,719 A | 11/1988 | Gupta | |
| 5,517,560 A | 5/1996 | Greenspan | |
| 5,822,411 A | 10/1998 | Swale et al. | |
| 5,937,044 A | 8/1999 | Kim | |
| 6,208,722 B1 | 3/2001 | Sawatzki et al. | |
| 6,427,008 B1 | 7/2002 | Balaz | |
| 6,556,818 B1 * | 4/2003 | Meehan | 455/406 |
| 6,639,977 B1 | 10/2003 | Swope et al. | |
| 7,151,824 B1 * | 12/2006 | Bingaman et al. | 379/114.22 |
| 7,362,853 B2 | 4/2008 | Halkosaari | |
| 2005/0015444 A1 * | 1/2005 | Rambo | 709/204 |

FOREIGN PATENT DOCUMENTS

| | | |
|---|---|---|
| CN | 1157681 A | 8/1997 |
| WO | WO2004/056079 | 7/2004 |

* cited by examiner

*Primary Examiner* — Quoc D Tran
(74) *Attorney, Agent, or Firm* — Suiter Swantz pc llo

(57) ABSTRACT

The present invention is directed to a method and system for altering an administrator of a multi-way call during the multi-way call connection and transferring the associated charges from one administrator to another. After a multi-way call connection is established from the originating party to many participating parties, the originating party may be given an opportunity to shift an administrator role to one of the participating parties. The participating party designated to be a new administrator may accept or refuse the request from the originating party. Once the participating party accepts the new administrator role, the subsequent charges may be transferred to the participating party and the originating party may be able to continue in or to drop out from the multi-way call without further responsibility of charges.

18 Claims, 3 Drawing Sheets

METHOD AND SYSTEM FOR TRANSFERRING AN ADMINISTRATOR AND ASSOCIATED CHARGES DURING A MULTI-WAY CALL

CROSS REFERENCE TO RELATED APPLICATIONS

The present application is a continuation of U.S. application Ser. No. 10/965,145, filed Oct. 14, 2004. Said U.S. application Ser. No. 10/965,145 is hereby incorporated by reference in its entirety.

FIELD OF THE INVENTION

The present invention generally relates to the field of telephone communications systems, and particularly to a method and system for administration and billing arrangements for a multi-way call.

BACKGROUND OF THE INVENTION

Today's modern telephone systems provide individuals and businesses with a variety of customized calling package plans and services. Many features such as call waiting, call-forwarding, three-way calling and the like have been provided. The three-way call has been utilized when a user needs to simultaneously communicate with more than one party. Conventionally, a three-way call may be initiated by a call originating party calling two other parties to participate in the three-way call. For instance, a three-way call is made through the call originating party calling a second attending party, pressing a flash button (or depressing a switch hook) on a telephone, then calling a third attending party, and pressing a flash button or a connect button. At this point, the three-way call has been established and each of the three parties can converse with each other. Three-way calling is often also referred to as a caller-originated conference call or a multi-way call.

Generally, the charges for the three-way call are levied solely on the originating party. A problem occurs when the call originating party desires to drop out of the three-way call or does not want to continue to pay the call charges. If one of the participating parties desires to become a new originating party, then that party must establish a new connection if the other participating parties desire to continue the conversation. However, establishing a new connection may be time consuming since it requires the new originating party to provide the telephone numbers of all other participating parties. Often, the new originating party may not have telephone numbers of the participating parties. Further, the important multi-way call may be delayed until the new connection is established. In addition, new call connection charges may be incurred in addition to the standard line usage charges.

Therefore, it would be desirable to provide a method and system for altering an administrator of the multi-way call connection so that the multi-way call can be maintained even after the originating party drops out or declines to continue to pay the charges. It would be also desirable to provide a method and system that could transfer billing responsibility and delegation of control of the multi-way call connection from the originating party to the new administrator.

SUMMARY OF THE INVENTION

Accordingly, the present invention provides a method and system for altering the administration of a multi-way call during the multi-way call connection and transferring the associated charges and delegation of control from one administrator to another. After a multi-way call connection is established from the originating party to one or many participating parties, the originating party may be given an opportunity to shift an administrator role to one of the participating parties. In general, the charges associated with the multi-way call are levied solely on the administrator of the multi-way call connection. Conventionally, the administrator may be an originating party of the multi-way call. In the present invention, the subsequent charges may be transferred to a new administrator designated by the originating party during a multi-way call connection.

In a first aspect of the present invention, a method for processing a charge transfer request from an originating party to a participating party during a multi-way call connection is provided. The multi-way call connection may be established through a phone service system capable of transferring an administrator role from the originating party (a first user) to one of the participating parties (a second user). After the multi-way call connection is established, the first user may request a charge transfer to the second user during the multi-way call connection by specifying the telephone number of the second user. The second user may be notified that the first user requested the charge transfer for the multi-way call. The second user may accept or refuse the request by entering predetermined keys on a telephone device. The charge may be transferred to the second user at the time when the second user accepts the request. The second user may become a new administrator of the multi-way call. Then, the first user and the second user may be notified that the charge has been transferred to the second user. The first user may not be responsible for the charges incurred after the transfer. Each billing record including billing information associated with the multi-way call may be stored in a database. The billing records may be utilized to record all charges associated with the multi-way call. The first user may also be notified of the refusal when the second user refuses the request of the charge transfer. In such a case, the first user will remain as the administrator of the multi-way call.

In a second aspect of the present invention, a multi-way call management system capable of transferring an administrator role from the originating party to one of the participating parties is provided. The multi-way call management system may comprise a database for storing billing records containing information as to the cost of the multi-way call connection. A control module coupled to a database may be configured to establish a multi-way call connection. The control module may be capable to transfer an administrator role from the originating party (a first user) to one of the participating parties (a second user) by specifying the telephone number of the second user. Each billing record including billing information associated with the multi-way call may be stored in the database. The billing records may be utilized to record all charges associated with the multi-way call. After the multi-way call connection is established, the first user may request an administrator change designating the second user to the control module. The second user may be notified that the first user has requested the administrator change and the charges for the multi-way call may be transferred to the second user. The second user may accept or refuse the request by entering predetermined keys on a telephone device. The second user may become a new administrator of the multi-way call if the control module receives an accepting acknowledgement from the second user. Then, the first user and the second user may be notified that the second user is a new administrator. The control module may update billing records associated with the multi-way call accordingly. The first user may not be responsible for the charges incurred after the transfer. Additionally, the first user may also be notified of the refusal acknowledgment from the second user.

Further, the multi-way call management system may determine the new administrator based on the order in which the participating parties were added to the multi-way call connection rather than by specifying the telephone number of the new administrator. Thus, the first user could transfer administration and charges to another user by specifying that user's connection-order number, rather than by specifying the user's telephone number. The present invention then allows the first user to continue or to drop out from the multi-way call without further responsibility for the charges.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 3B, exemplary embodiments of the present invention are shown.

The present invention is directed to a method and system for altering an administrator of a multi-way call during the multi-way call connection, and transferring the associated charges from one administrator to the other. After a multi-way call connection is established from the originating party to one or more participating parties, the originating party may be given an opportunity to shift an administrator role to one of the participating parties. In general, the charges associated with the multi-way call are levied solely on the administrator of the multi-way call connection. Conventionally, the administrator may be an originating party of the multi-way call. In the present invention, the subsequent charges may be transferred to a new administrator designated by the originating party during a multi-way call connection. In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Figure 1:
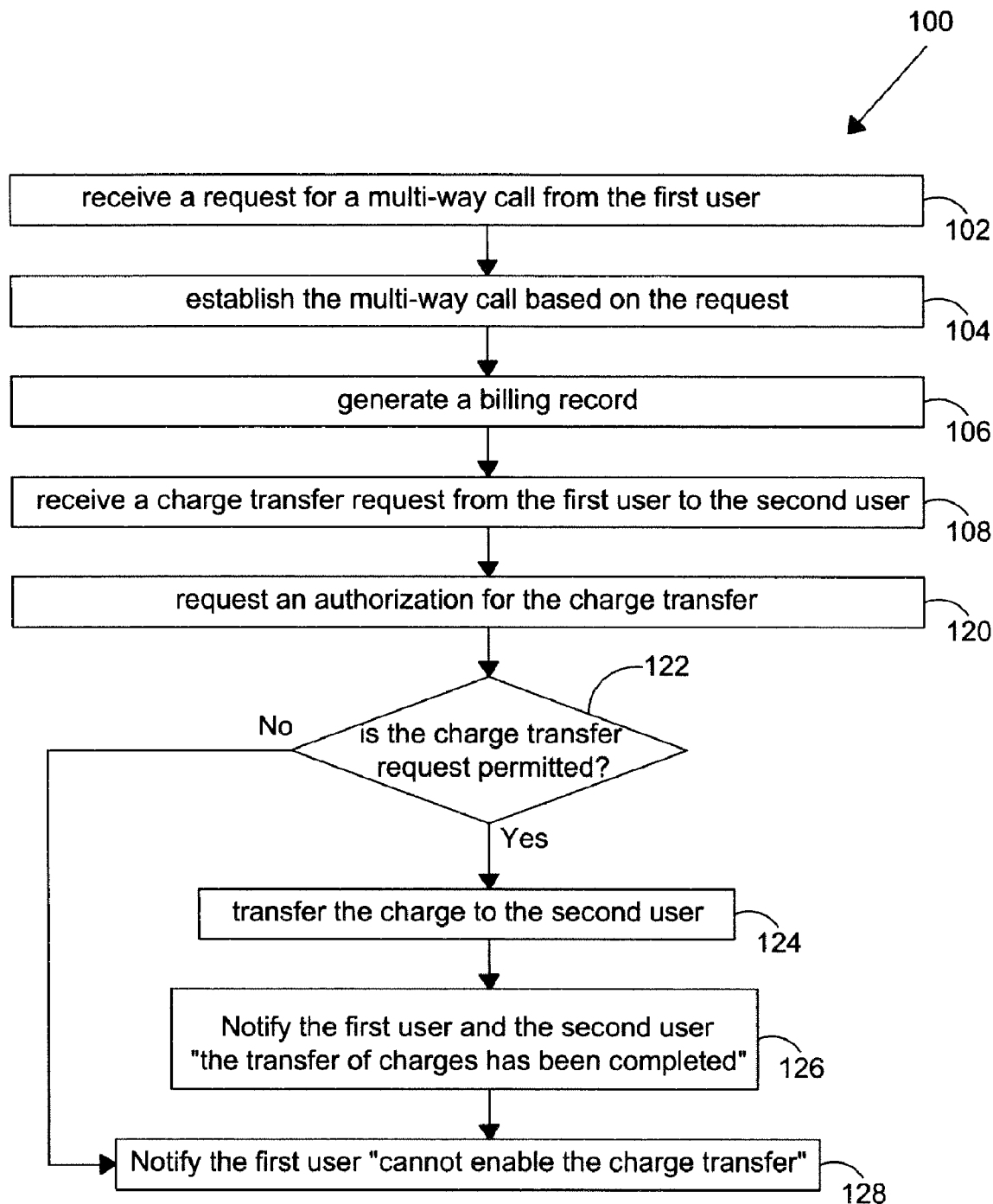
FIG. 1 is a flow diagram illustrating a method implemented by a multi-way connection management system in accordance with an exemplary embodiment of the present invention.

Referring now to FIG. 1, a flow diagram 100 illustrating a method implemented by a multi-way call connection management system in accordance with the present invention is shown. The method begins in step 102 in which a request for a multi-way call is received from a first user (an originating party). The request may include telephone numbers of other participating parties. The multi-way call may be established by a conventional telephone service system by connecting the first user and other participating parties based on the request. The conventional telephone service system may include a wireless telephone service system, a land line telephone service system, a private branch exchange (PBX) service system, a Voice over Internet Protocol (VoIP) system, or the like. One of skill in the art will appreciate that establishing a multi-way connection by a conventional telephone service system is known to the art. An example of the multi-way call may include a three-way call. In a particular embodiment of the present invention, a three-way call is made through the call originating party calling a second attending party, pressing a flash button (or depressing a switch hook) on a telephone, then calling a third attending party, and pressing a flash button or a connect button. The flash button may be provided on a conventional telephone device to provide a three-way call. Although this example depicts three parties involved in the multi-way call, one of skill in the art will appreciate that at least two parties may be sufficient to conduct a multi-way call.

In step 106, a billing record associated with the multi-way connection is generated. The billing record may include information necessary to calculate the charges of the multi-way call connection. Initially, the first user is responsible for all charges incurred during the multi-way call. For instance, the billing record may include administrator information, starting time of call, ending time of call, duration of call, date of call and the like. The generated billing record may be stored in a database. Upon termination of the multi-way call by the first user, the billing record may be utilized to generate a raw Call Detail Record (CDR) suitable for a billing center of the phone service provider of the first user. One of skill in the art will appreciate that the CDR is a generic term for a data record that contains information related to a telephone call, such as the origination and destination addresses of the call, the time the call started and ended, the duration of the call, the time of day the call was made and any toll charges that were added through the network, charges for operator services, or charges for connection services and airtime, among other details of the call.

In step 108, a request for a charge transfer is received from the first user during the multi-way call connection. In a particular embodiment of the present invention, the first user may enter predefined keys followed by the telephone number of the second user who is desired to be a new administrator of the call. For example, the first user may enter "*77" followed by the telephone number of the second user. Alternatively, the multi-way call management system may determine the new administrator (the second user) based on the order of the participating parties added to the multi-way call connection. Thus, the first user and the second user may be able to plan the charge transfer before the multi-way call connection is initiated with additional participants. For example, the first user may enter a predefined keystroke sequence (e.g. "*77" or the like) to request the multi-way call management system to provide the new administrator based on the order of the participating parties added to the multi-way call connection. In an embodiment of the present invention, the multi-way call management system may store information of the order of the participating parties added by the first user in the database. In step 120, a request is made of the second user to permit the charge transfer. In step 122, whether the second user accepts the charge transfer request may be determined. For example, a visual or audio announcement message may be utilized asking "Do you accept a charge transfer request from the first user?" The second user may enter predetermined keys (e.g. "1" for Yes, "2" for No) to accept or refuse the charge transfer request. If the second user accepts the charge transfer request, the second user may become the new administrator of the multi-way call and be responsible for the charges incurred after the charge transfer in step 124. Then, in step 126, the first and the second user may be notified of the charge transfer completion. The first user may drop out of the multi-way call without disconnecting other participating parties. If the second user refuses the charge transfer request, the first user may be notified of the refusal in step 128. Then, the first user may continue to be the administrator of the multi-way call.

Figure 2:
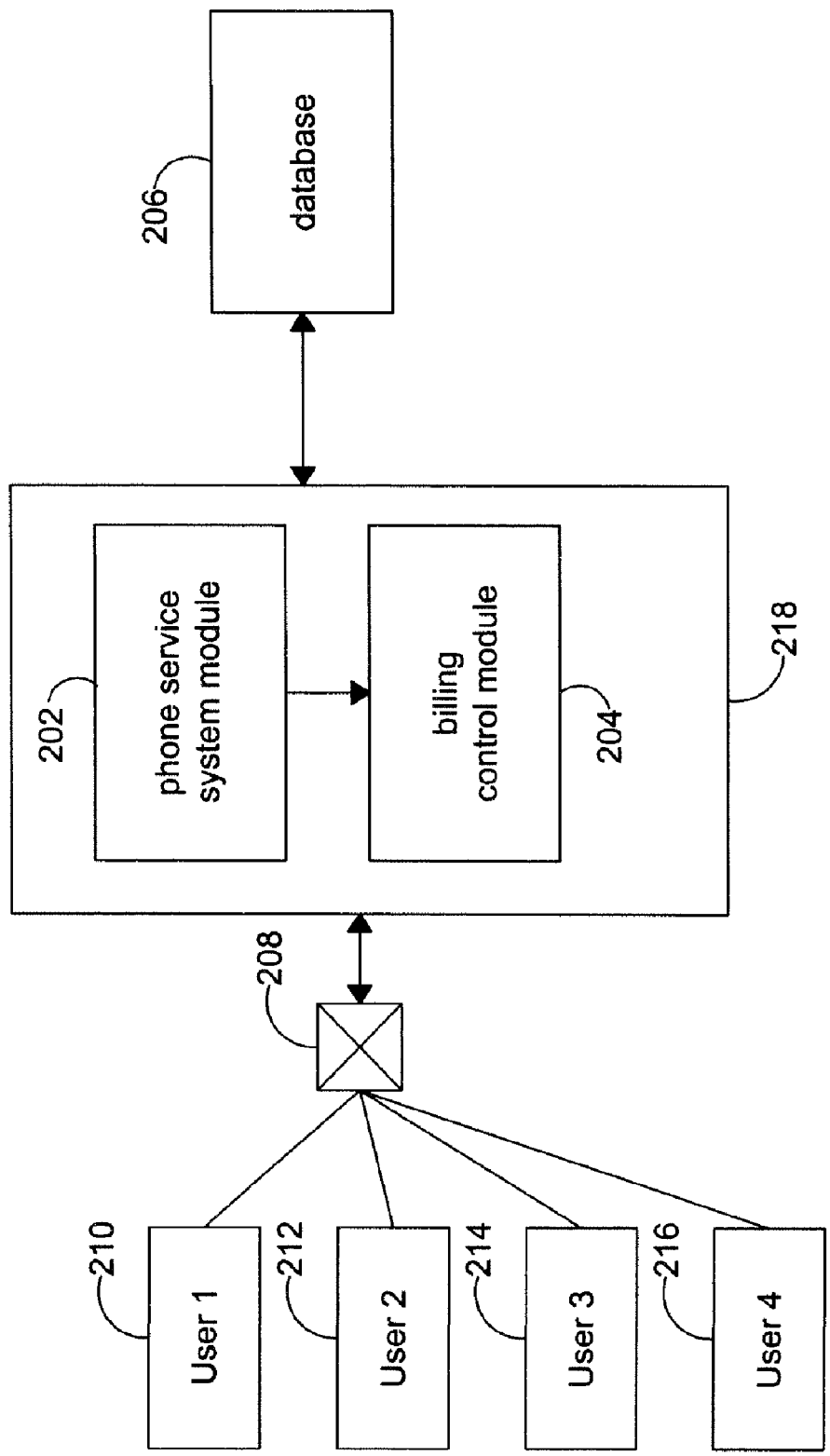
FIG. 2 is an illustration of block diagram of an exemplary system capable to implement the method illustrated in FIG. 1 in accordance with the present invention.

Referring now to FIG. 2, a block diagram 200 of a multi-way call management system is shown. The multi-way call management system may comprise a database 206 for storing billing records containing information as to the cost of the multi-way connection of many users 210-216. The billing records may be utilized to record all charges incurred during the multi-way call. A control module 218 coupled to a database may be configured to establish a multi-way call connection 208 through a phone service module 202. The phone service module 202 may be capable of transferring an administrator role from the originating party to one of the participating parties. The control module 218 may include a billing control module 204 configured to manage a request for the administrator change (and request for the charge transfer). For example, the multi-way call connection 208 may be established connecting from first user 210 to second user 212, third user 214 and the fourth user 216. The first user may be an originating party of the multi-way call connection 208. The first user 210 may request an administrator change from the first user 210 to the second user 212 via the control module 218. The first user may instead request a change to the third user 214 or the fourth user 216.

Upon detection of the request, the billing control module 204 communicatively coupled to the phone service module 202 prompts an announcement which may require authorization of the change by the second user 212. It should be appreciated that there are various ways to implement such an announcement. For example, the announcement may include an audio recording announcement through a telephone device. Alternatively, a visual text announcement may be displayed on a telephone device. The second user 212 may become the new administrator of the multi-way call 208 if the billing control module 204 receives an accepting acknowledgement from the second user. Then, the first user 210 and the second user 212 may be notified that the second user 212 has become the new administrator of the multi-way call 208. The billing control module 204 may update billing records associated with the multi-way call stored in the database 206. Additionally, the first user 210 may also be notified of the refusal acknowledgment from the second user. In such a case, the first user 210 may remain as the administrator of the multi-way call connection 208.

In a particular embodiment of the present invention, a Voice Response System (VRS) may be utilized by the phone service module. Conventionally, a Voice Response System operates with a limited vocabulary in situations where the sentences and/or phrases that are formed follow a strict predetermined pattern. Users may enter predefined speech patterns, predefined key patterns or the like in order to respond to the VRS. For example, the phone service module may prompt an announcement such as "Do you accept a charge transfer request from the first user? Please press or say "1" to accept the request. Please press or say "2" to refuse the request." via the VRS. The second user may speak "one" or press "1" on a touch tone key pad to accept the charge transfer request. The second user may speak "two" or press "2" on a touch tone key pad to refuse the charge transfer request.

Figure 3A:
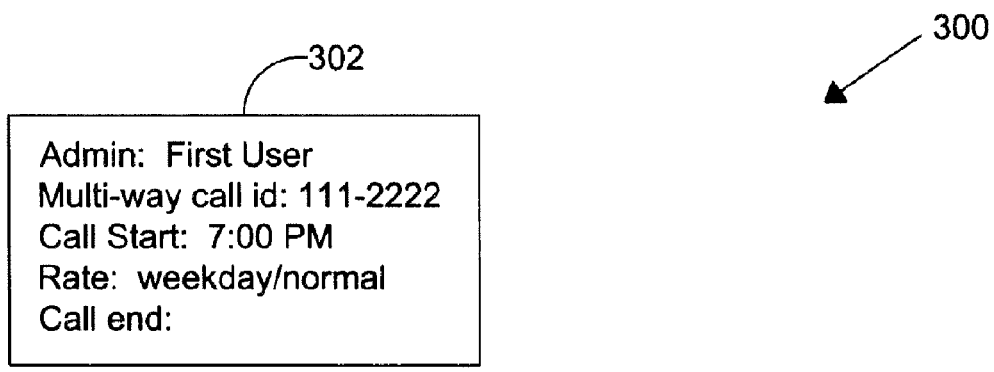
FIGS. 3A-B depict a database including billing records in the method implemented by the multi-way call connection system in FIG. 1.
Figure 3B:
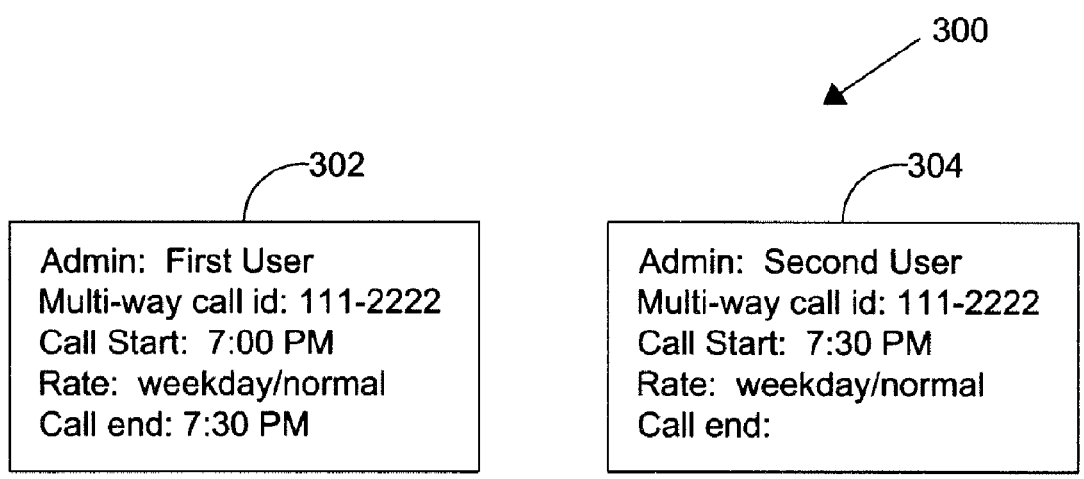

Referring now to FIGS. 3A-B, an exemplary database 300 including billing records utilized by the present invention is shown. The billing record may include information necessary to calculate the charges of the multi-way call connection. Each billing record including billing information associated with the multi-way call may be stored in the database 300. The billing records may be utilized to record all charges associated with the multi-way call.

In a particular embodiment of the present invention, the billing record may include a multi-way call id field, an administrator field, a call start field, a call end field, a duration field, a date field and the like. There may be multiple billing records associated with one multi-way call connection. Initially, the first user (originating party) is responsible for all charges incurred during the multi-way call. In FIG. 3A, a billing record 302 is generated when the phone service module establishes a multi-way call connection from the first user to other participating parties at 7:00 PM. The billing record 302 may include an administrator field containing "First User" indicating that the first user is the administrator, a call start field containing a time stamp of 7:00 PM, a rate field containing rate information of the first user and the like. The generated billing record 302 may be stored in the database. The billing record may be modified to include a call ending field containing a time stamp of the termination when the first user terminates the multi-way call connection.

Whenever there is a change of an administrator role, a new billing record may be generated. For example, in FIG. 3B, a new billing record 304 may be generated when the second user accepts the request of the administrator change from the first user at 7:30 PM. The billing record 304 may include an administrator field containing "Second User" indicating that the second user is the administrator, a call start field containing a time stamp of 7:30 PM, a rate field containing rate information of the second user and the like. The billing record 302 may also be updated indicating that the first user is not responsible for charges incurred after 7:30 PM. The billing record 302, 304 may be utilized to generate a raw Call Detail Record (CDR) suitable for a billing center of the phone service provider. In this manner, the first user may be given an opportunity to shift an administrator role to one of the participating parties during the multi-way call connection and thus the first user may be allowed to continue or to drop out from the multi-way call without further responsibility of the charge. If the two users have different telephone service providers, this CDR may be utilized for the transfer of charges from one service provider to the other.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described is merely an explanatory embodiment thereof. It is the intention of the following claims to encompass and include such changes.

What is claimed is:

1. A method for processing a charge transfer request from a first user to a second user during a multi-way telephone call, comprising:
   receiving a charge transfer request from the first user;
   generating a billing record of the first user associated with the multi-way call;
   requesting an authorization for the charge transfer to the second user, said requesting the authorization for the charge transfer including the steps of: determining the second user among the plurality of participating users based on a multi-way call request, the multi-way call request including the plurality of desired participating users of the multi-way call, the multi-way call request being received from the first user; and determining an order of the remaining participating users added by the first user following the multi-way call request;
   storing the order of the remaining participating users added by the first user following the multi-way call request;
   transferring a charge to the second user if the second user authorizes the charge transfer request, wherein the second user becomes an administrator of the multi-way call after the charge is transferred to the second user;
   notifying the transferred charge to the first user and the second user if the second user authorizes the charge transfer request; and
   notifying the first user that the second user refuses the charge transfer request if the second user does not authorize the charge transfer request,
   wherein the first user is an initial administrator of the multi-way call and has originated the multi-way telephone call connecting a plurality of participating users which includes the second user.

2. The method as described in claim 1, further comprising:
   retrieving a billing record of the first user for the multi-way call connection,
   wherein the billing record of the first user is generated at the time when the multi-way call connection is established.

3. The method as described in claim 2, further comprising: updating the billing record of the first user based on the time of the charge transfer.

4. The method as described in claim 1, further comprising: generating a billing record of the second user for the multi-way call at the time the charge is transferred to the second user.

5. The method as described in claim 1, wherein the multi-way call is established by a land line phone service system.

6. The method as described in claim 1, wherein the multi-way call is established by a wireless phone service system.

7. The method as described in claim 1, wherein the multi-way call is established by a private branch exchange system.

8. The method as described in claim 1, wherein the multi-way call is established by a Voice over Internet Protocol (VoIP) system.

9. The method as described in claim 1, wherein the charge transfer request is responded via a predefined user input.

10. The method as described in claim 9, wherein the predetermined user input includes predefined speech patterns and predefined key patterns.

11. The method as described in claim 1, further comprising:
    terminating the multi-way call when the administrator of the multi-way call desires to terminate the multi-way call.

12. A system for changing an administrator from a first user to a second user during a multi-way telephone call, comprising:
    means for receiving an administrator change request from the first user to the second user;
    means for generating a billing record of the first user associated with the multi-way call;
    means for requesting a permission from the second user whether the second user desires to be the administrator, said requesting the authorization for the charge transfer including the steps of: determining the second user among the plurality of participating users based on a multi-way call request, the multi-way call request including the plurality of desired participating users of the multi-way call, the multi-way call request being received from the first user; and determining an order of the remaining participating users added by the first user following the multi-way call request;
    means for storing the order of the remaining participating users added by the first user following the multi-way call request;
    means for transferring a charge for the multi-way call to the second user if the second user accepts the administrator change request;
    means for notifying the transferred charge to the first user and the second user upon transfer of the charge to the second user;
    means for notifying the first user that the second user does not desire to be the administrator if the second user refuses the administrator change request,
    wherein the first user is an initial administrator of the multi-way call and has originated the multi-way telephone call connecting a plurality of participating users which includes the second user.

13. The system as described in claim 12, further comprising:
    means for retrieving a billing record of the first user for the multi-way call, wherein the billing record of the first user is generated at the time when the multi-way call is established.

14. The system as described in claim 13, further comprising:
    means for updating the billing record of the first user based on the time of the charge transfer.

15. The system as described in claim 12, wherein the administrator change request is responded via a predefined user input.

16. The system as described in claim 13, wherein the predetermined user input includes predefined speech patterns and predefined key patterns.

17. A multi-way call connection management system capable to alter an administrator from a first user to a second user during a multi-way call connection wherein the first user is an originating party of the multi-way call and the second user is a participating party, comprising:
    a database for storing a plurality of billing records containing information as to the cost of the multi-way connection;

a control module coupled to a database, the control module configured to establish a multi-way call connection, further comprising:

means for receiving a request to alter the administrator from the first user to the second user;

means for generating a billing record of the first user associated with the multi-way call;

means for requesting a permission from the second user whether the second user desires to be the administrator, said requesting the authorization for the charge transfer including the steps of: determining the second user among the plurality of participating users based on a multi-way call request, the multi-way call request including the plurality of desired participating users of the multi-way call, the multi-way call request being received from the first user; and determining an order of the remaining participating users added by the first user following the multi-way call request;

means for storing the order of the remaining participating users added by the first user following the multi-way call request;

means for transferring a charge for the multi-way call to the second user if the second user accepts the request, wherein the second user becomes a new administrator of the multi-way call connection and the first user becomes a participating party of the multi-way call;

means for notifying the first user and the second user of the charge transfer if the second user accepts the request; and means for notifying the first user that the second user does not desire to be the administrator if the second user refuses the request.

18. The multi-way call connection management system as described in claim 17, wherein the first user remains as the administrator when the second user does not desire to be the administrator.

* * * * *